United States Patent [19]

Cameron

[11] Patent Number: 5,557,180
[45] Date of Patent: Sep. 17, 1996

[54] CIRCUIT AND METHOD FOR OPERATING A 3-PHASE MOTOR WITH A UNI-COIL PHASE COMMUTATION SCHEME

[75] Inventor: Scott W. Cameron, Milpitas, Calif.

[73] Assignee: SGS-Thomson Microelectronics, Inc., Carrollton, Tex.

[21] Appl. No.: 85,507

[22] Filed: Jun. 30, 1993

[51] Int. Cl.[6] .................................................. H02P 1/18
[52] U.S. Cl. ........................................ 318/254; 318/439
[58] Field of Search .................................... 318/254, 138, 318/809, 803, 807, 531, 806, 808, 727, 767, 798, 439; 361/92, 88; 219/130.51, 137 R; 310/182, 180, 189, 184, 68 R; 363/89, 126, 127

[56] References Cited

U.S. PATENT DOCUMENTS

| | | | |
|---|---|---|---|
| 2,805,383 | 9/1957 | Hurlburt | 323/44 |
| 3,045,166 | 7/1962 | Robinson | 318/367 |
| 3,378,755 | 4/1968 | Sawyer | 322/29 |
| 3,526,816 | 9/1970 | Paice et al. | 318/226 |
| 3,577,929 | 5/1971 | Onoda et al. | 318/771 |
| 3,627,974 | 12/1971 | Normando et al. | 219/130.51 |
| 3,636,541 | 1/1972 | Genuit | 361/92 |
| 3,854,077 | 12/1974 | Greenwell | 318/808 |
| 3,931,553 | 1/1976 | Stich et al. | 318/138 |
| 3,975,668 | 8/1976 | Davie | 318/212 |
| 4,667,282 | 5/1987 | Peterson | 363/89 |
| 4,922,169 | 5/1990 | Freeman | 318/138 |
| 5,001,405 | 3/1991 | Cassat | 318/254 |
| 5,003,241 | 3/1991 | Rowan et al. | 318/761 |
| 5,218,253 | 6/1993 | Morehouse et al. | 310/184 |
| 5,223,771 | 6/1993 | Chari | 318/254 |
| 5,294,877 | 3/1994 | Cameron | 318/809 |

*Primary Examiner*—John W. Cabeca
*Attorney, Agent, or Firm*—Richard A. Bachand; Joseph C. Arrambide; Lisa K. Jorgenson

[57] ABSTRACT

A circuit and method for operating a polyphase dc motor of the type having a plurality of driving coils connected together at a center tap current input node. Each driving coil have a current input node at an end opposite the center tap connection. A plurality of pairs of switches are arranged for connection in series across a power supply voltage. Each pair have a connection node between each switch connected to a respective one of the current input nodes. A sequencer individually operates the switches to cause a driving current to be passed between sequentially selected only single ones of the driving coils and the center tap current input node.

13 Claims, 7 Drawing Sheets

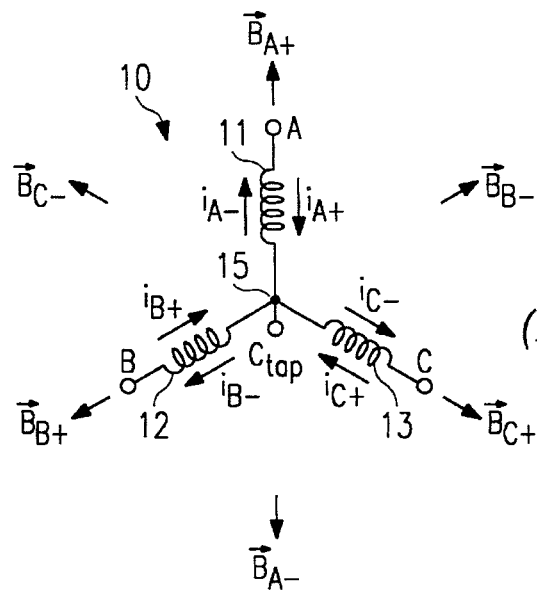

FIG. 1
(PRIOR ART)

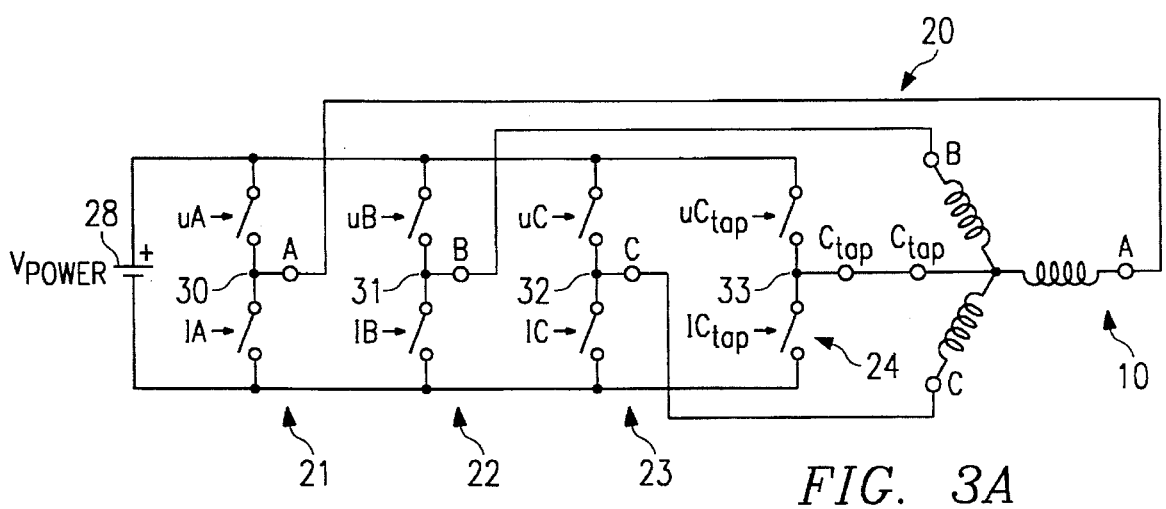

FIG. 3A

| | CURRENT FLOWS FROM-TO | FLOATING COILS | uA | IA | uB | IB | uC | IC | uC$_{tap}$ | IC$_{tap}$ |
|---|---|---|---|---|---|---|---|---|---|---|
| PHASE (A+) | A→C$_{tap}$ | B AND C | ON | OFF | OFF | OFF | OFF | OFF | OFF | ON |
| PHASE (C−) | C$_{tap}$→C | A AND B | OFF | OFF | OFF | OFF | OFF | ON | ON | OFF |
| PHASE (B+) | B→C$_{tap}$ | A AND C | OFF | OFF | ON | OFF | OFF | OFF | OFF | ON |
| PHASE (A−) | C$_{tap}$→A | B AND C | OFF | ON | OFF | OFF | OFF | OFF | ON | OFF |
| PHASE (C+) | C→C$_{tap}$ | A AND B | OFF | OFF | OFF | OFF | ON | OFF | OFF | ON |
| PHASE (B−) | C$_{tap}$→B | A AND C | OFF | OFF | OFF | ON | OFF | OFF | ON | OFF |

FIG. 3B

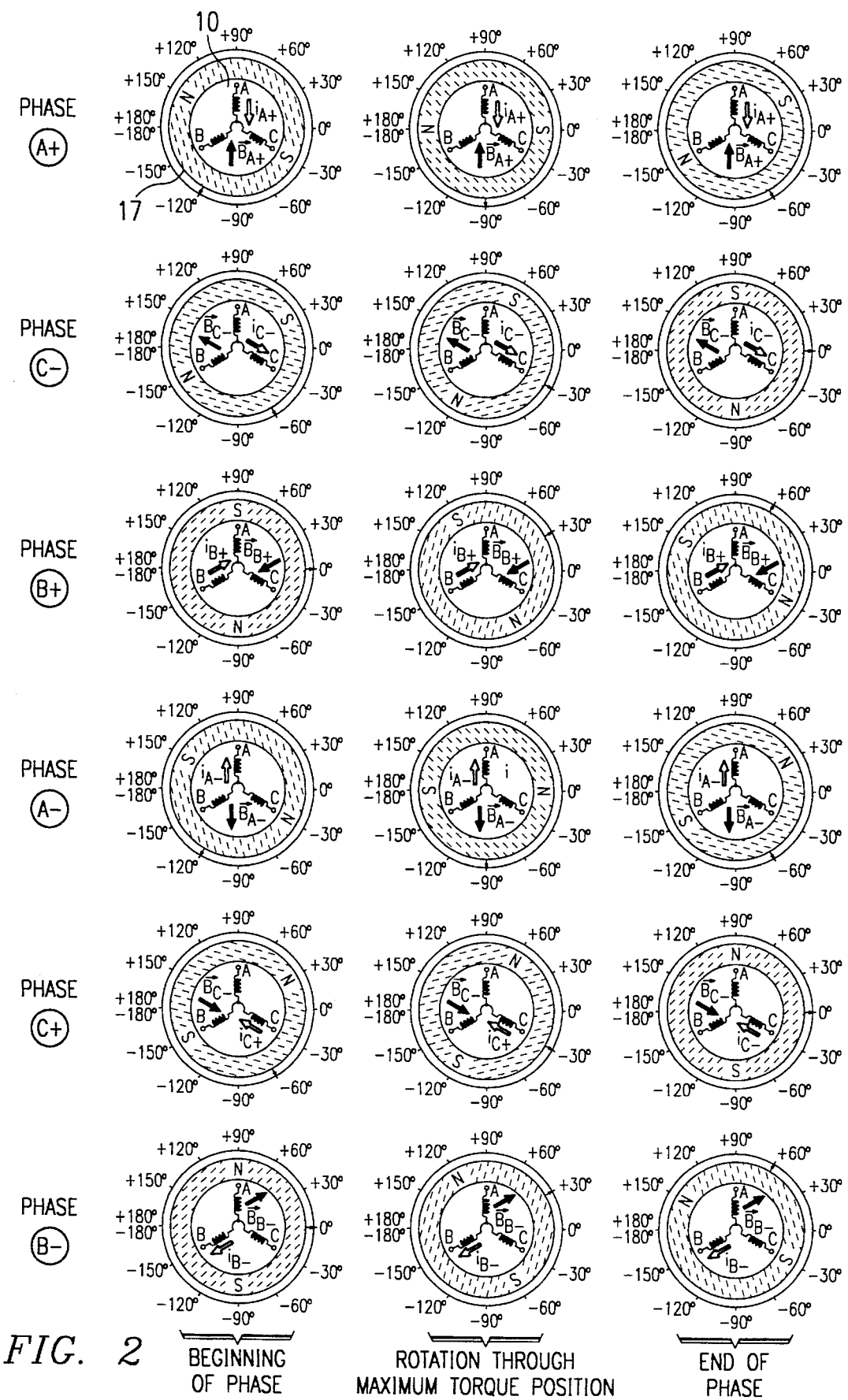
FIG. 2  BEGINNING OF PHASE   ROTATION THROUGH MAXIMUM TORQUE POSITION   END OF PHASE

COMMUTATION LOGIC FOR COMBINED MODES

| | CURRENT FLOWS FROM-TO | FLOATING COIL(S) | uA | IA | uB | IB | uC | IC | uC$_{tap}$ | IC$_{tap}$ | ONE/TWO | |
|---|---|---|---|---|---|---|---|---|---|---|---|---|
| PHASE (A+) | A→C$_{tap}$ | B AND C | 1 | 0 | 0 | 0 | 0 | 0 | 0 | 1 | 0 | ⎫ |
| PHASE (C−) | C$_{tap}$→C | A AND B | 0 | 0 | 0 | 0 | 0 | 1 | 1 | 0 | 0 | ⎪ |
| PHASE (B+) | B→C$_{tap}$ | A AND C | 0 | 0 | 1 | 0 | 0 | 0 | 0 | 1 | 0 | ONE COIL MODE |
| PHASE (A−) | C$_{tap}$→A | B AND C | 0 | 1 | 0 | 0 | 0 | 0 | 1 | 0 | 0 | ⎪ |
| PHASE (C+) | C→C$_{tap}$ | A AND B | 0 | 0 | 0 | 0 | 1 | 0 | 0 | 1 | 0 | ⎪ |
| PHASE (B−) | C$_{tap}$→B | A AND C | 0 | 0 | 0 | 1 | 0 | 0 | 1 | 0 | 0 | ⎭ |
| PHASE ① | A→B | C | 1 | 0 | 0 | 1 | 0 | 0 | 0 | 0 | 1 | ⎫ |
| PHASE ② | A→C | B | 1 | 0 | 0 | 0 | 0 | 1 | 0 | 0 | 1 | ⎪ |
| PHASE ③ | B→C | A | 0 | 0 | 1 | 0 | 0 | 1 | 0 | 0 | 1 | DUAL COIL MODE |
| PHASE ④ | B→A | C | 0 | 1 | 1 | 0 | 0 | 0 | 0 | 0 | 1 | ⎪ |
| PHASE ⑤ | C→A | B | 0 | 1 | 0 | 0 | 1 | 0 | 0 | 0 | 1 | ⎪ |
| PHASE ⑥ | C→B | A | 0 | 0 | 0 | 1 | 1 | 0 | 0 | 0 | 1 | ⎭ |

*FIG. 5*

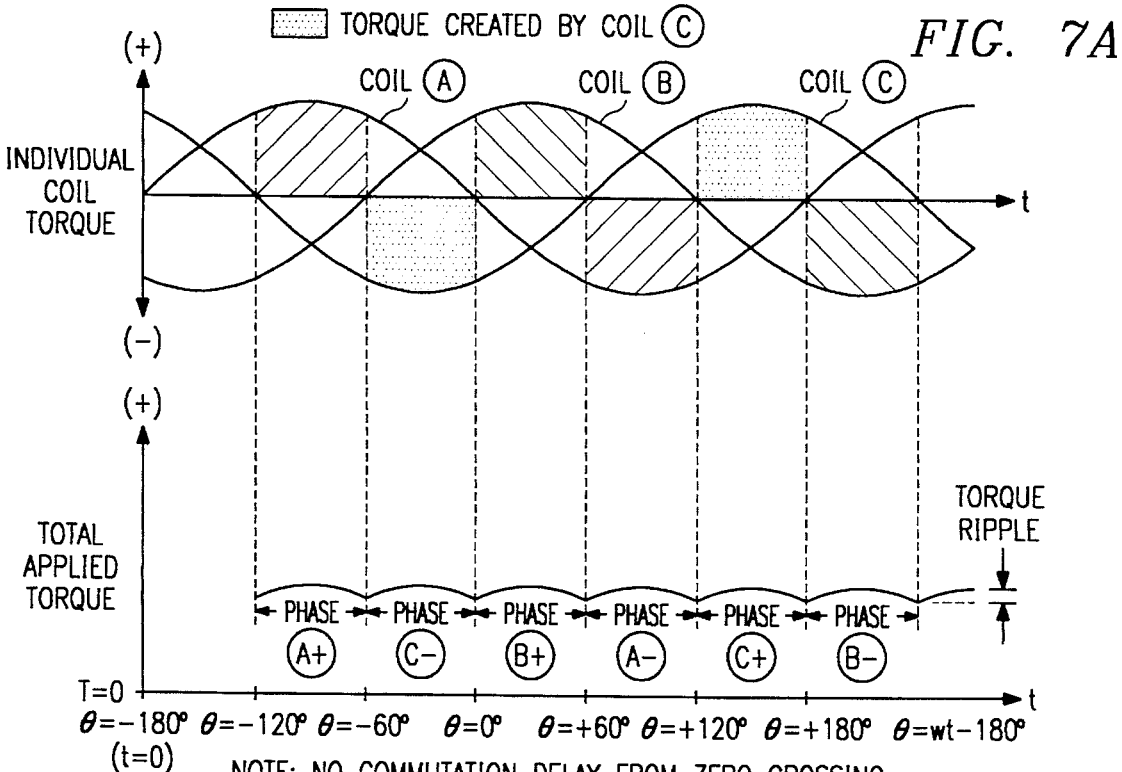

CIRCUIT AND METHOD FOR OPERATING A 3-PHASE MOTOR WITH A UNI-COIL PHASE COMMUTATION SCHEME

BACKGROUND OF THE INVENTION

1. Field of the Invention

This invention pertains to improvements in circuits and methods for operating polyphase dc motors, and more particularly, to improvements in methods and circuits for operating sensorless 3-phase dc motors through coil phase commutation techniques.

2. Technical Background

The present invention pertains to polyphase dc motors, and particularly to brushless, sensorless polyphase dc motors that are used for rotating data media, such as found in computer related applications, including hard disk drives, CD ROM drives, floppy disks, and the like. In such computer applications, three phase brushless, sensorless dc motors are becoming more popular, due to their reliability, low weight, and accuracy.

Motors of this type can typically be thought of as having a centrally located stator with three coils connected in a "Y" configuration, although actually, a larger number of stator coils are usually employed with multiple motor poles. In normal operation, the coils are energized in sequences in which current paths are established through various coils combinations, in, for instance, six commutation sequences.

More particularly, generally in the conventional operation of three phase motors, current is passed through two coils of the "Y" connected coil configuration, while the third coil is used to generate back emf (bemf) to be sensed for commutation purposes. The maximum achievable speed is related to the maximum torque that the coil arrangement can physically generate, hence, the maximum current capable of being passed through both coils. This in turn is limited by both the back emf produced by the spinning rotor, and the series resistance of the two commutatively selected coils. All possible current combinations for any two of the three terminals (the center tap being reserved for back emf sensing) yields a total of six equi-distant magnetic vectors to commutate through, spinning the rotor.

SUMMARY OF THE INVENTION

In light of the above, therefore, it is an object of the invention to provide an improved method and circuit for driving a polyphase dc motor.

It is another object of the invention to provide a method and circuit of the type described that can be used to operate a 3-phase motor with increased efficiency, and at decreased supply voltages.

It is another object of the invention to provide a method and circuit of the type described that can be integrated onto an integrated circuit chip together with other motor driving circuitry.

These and other objects, features, and advantages will become apparent to those skilled in the art from the following detailed description when read in conjunction with the accompanying drawings and appended claims.

A circuit for operating a polyphase dc motor of the type having a plurality of driving coils connected together at a center tap current input node, each driving coil having a current input node at an end opposite the center tap connection, has a plurality of pairs of switches. Each pair of switches is arranged for connection in series across a power supply voltage and has a connection node between each switch, connected to a respective one of the current input nodes. A sequencer for individually operating the switches to cause a driving current to be passed between sequentially selected only single ones of the driving coils and the center tap current input node. The switches may be MOSFETs, and the polyphase dc motor may be a three-phase dc motor with the driving coils connected in a "Y" configuration.

In one embodiment, the sequencer is configured to operate to close the switches in accordance with the following table:

|  | Current flows from–to | Floating Coils | uA | 1A | uB | 1B | uC | 1C | uCtap | 1Ctap |
|---|---|---|---|---|---|---|---|---|---|---|
| Phase A+ | A–Ctap | B&C | ON | OFF | OFF | OFF | OFF | OFF | OFF | ON |
| Phase C– | Ctap–C | A&B | OFF | OFF | OFF | OFF | OFF | ON | ON | OFF |
| Phase B+ | B–Ctap | A&C | OFF | OFF | ON | OFF | OFF | OFF | OFF | ON |
| Phase A– | Ctap–A | B&C | OFF | ON | OFF | OFF | OFF | OFF | ON | OFF |
| Phase C+ | C–Ctap | A&B | OFF | OFF | OFF | OFF | ON | OFF | OFF | ON |
| Phase B– | Ctap–B | A&C | OFF | OFF | OFF | ON | OFF | OFF | ON | OFF | in which:

the center tap is denoted Ctap;

each coil is denoted respectively A, B, and C;

each high side switch is denoted respectively uA, uB, uC, uCtap;

each low side switch is denoted respectively 1A, 1B, 1C, 1Ctap;

each phase is denoted (+) if current flows into the designated coil to the center tap and (–) if current flows out of the designated coil from the center tap;

an open switch is denoted OFF, and a closed switch is denoted "ON".

In another embodiment, the sequencer is configured to selectively operate in one coil and two coil modes to close the switches in accordance with the following table:

|  | Current flows from–to | Floating Coils | uA | 1A | uB | 1B | uC | 1C | uCtap | 1Ctap |
|---|---|---|---|---|---|---|---|---|---|---|
| Phase A+ | A–Ctap | B&C | ON | OFF | OFF | OFF | OFF | OFF | OFF | ON |
| Phase C– | Ctap–C | A&B | OFF | OFF | OFF | OFF | OFF | ON | ON | OFF |

-continued

|  | Current flows from-to | Floating Coils | uA | 1A | uB | 1B | uC | 1C | uCtap | 1Ctap |
|---|---|---|---|---|---|---|---|---|---|---|
| Phase B+ | B–Ctap | A&C | OFF | OFF | ON | OFF | OFF | OFF | OFF | ON |
| Phase A– | Ctap–A | B&C | OFF | ON | OFF | OFF | OFF | OFF | ON | OFF |
| Phase C+ | C–Ctap | A&B | OFF | OFF | OFF | OFF | ON | OFF | OFF | ON |
| Phase B– | Ctap–B | A&C | OFF | OFF | OFF | ON | OFF | OFF | ON | OFF |
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF | in which:

the center tap is denoted Ctap;

each coil is denoted respectively A, B, and C;

each high side switch is denoted respectively uA, uB, uC, uCtap;

each low side switch is denoted respectively 1A, 1B, 1C, 1Ctap;

each phase is denoted (+) if current flows into the designated coil to the center tap and (–) if current flows out of the designated coil from the center tap;

an open switch is denoted OFF, and a closed switch is denoted "ON".

In accordance with another broad aspect of the invention, a method is presented for operating a polyphase dc motor of the type having a plurality of driving coils connected together at a center tap current input node. Each driving coil has a coil current input node at an end opposite the center tap connection. A plurality of pairs of switches are arranged with each pair adapted for connection in series across a power supply voltage. Each pair of switches has a connection node between each switch connected to a respective one of the coil current input nodes. The method includes the steps of providing an additional pair of switches arranged for connection in series across the power supply voltage and having a connection node between each switch connected to the center tap, then individually operating the switches to cause a driving current to be passed between sequentially selected only single ones of the driving coils and the center tap current input node.

BRIEF DESCRIPTION OF THE DRAWINGS

The invention is illustrated in the accompanying drawings in which:

FIG. 1 is an electrical schematic diagram showing a typical "Y" connected coil arrangement with center tap connection, and the six magnetic vectors produced by various commuted current flow paths.

FIG. 2 is a series of diagrammatic representations of the various vectors during switching of uni-coil phases at various corresponding rotor positions.

FIG. 3A is an electrical schematic diagram showing a typical motor driver circuit that can be used in operation of a three phase dc motor, in accordance with the invention.

FIG. 3B is a table showing the various commutation switching signals to the driver transistors of the circuit of FIG. 3A for the various phases of operation, in accordance with the invention.

FIG. 5 is a table showing the various commutation switching signals to the driver transistors of the circuit of FIG. 3A for both uni-coil and dual coil modes of operation of the circuit of FIG. 3A or 4, in accordance with the invention.

FIGS. 7A and 7B are graphs, respectively of individual coil torque and total applied torque as a function of time, for a motor operated in accordance with the uni-coil driving technique of the invention.

Figure 4:
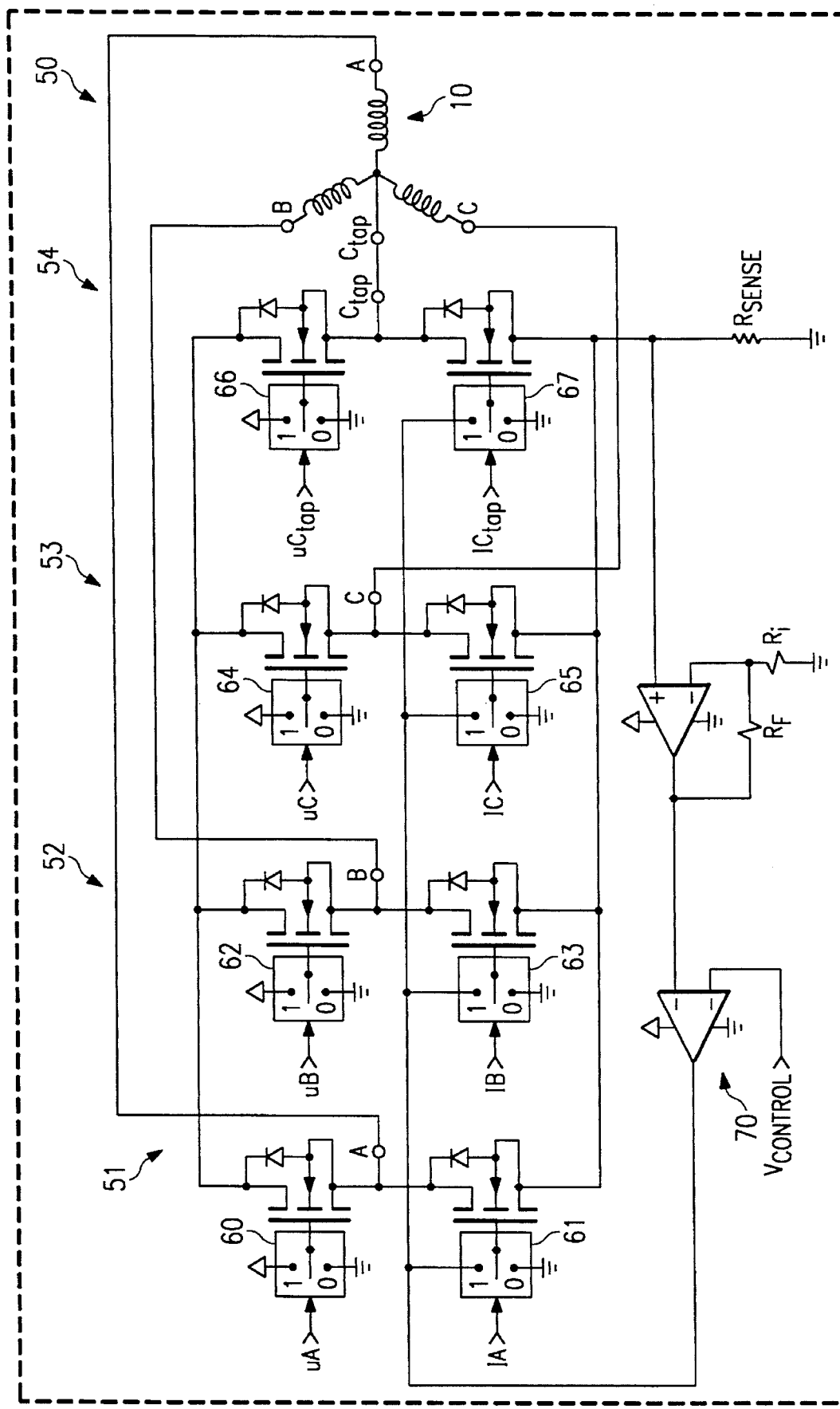
FIG. 4 is an electrical schematic diagram showing a MOSFET motor driver circuit, similar to the circuit of FIG. 3A, that can be used in operation of a three phase dc motor, in accordance with the invention.

In the various views of the drawings in which actual structures are depicted, the sizes and dimensions of the various parts may have been exaggerated for clarity of illustration and ease of description.

DETAILED DESCRIPTION OF A PREFERRED EMBODIMENT

As noted above, in the conventional operation of sensorless 3-phase motors, current is commutatively applied to selected coils of a "Y" connected coil configuration. As a commutation sequencer selects among the three coils to identify two at a time through which a driving current is passed, the third coil is placed in a floating state. The back emf generated in the floating coils is sensed to provide position information for commutation purposes.

The maximum achievable speed of the rotor is related to the maximum torque that can be developed, which, in turn is related to the maximum current that is capable of being passed through the two selected driving coils. The current, on the other hand, is limited both by the back emf produced by the spinning rotor in the floating coil, and the series resistance of the two coils. All possible current combinations for any two of the three coils (the center tap connection of the coils being reserved for back emf sensing only) yields a total of six equidistant magnetic vectors to commutate through, spinning the rotor.

According to the present invention, six equidistant vectors can also be produced if the center tap is switched, allowing current to flow only through one coil at a time. Thus, as shown in FIG. 1, a "Y" connected coil configuration 10 includes three coils 11, 12, and 13, connected at a common center tap connection node 15. The coils 11, 12, and 13 are referred to as coils "A", "B", and "C", and, more particularly, the respective nodes on the opposite sides of the coils 11–13 from the center tap 15 are abbreviatedly identified as A, B, and C, respectively. Thus, current can be injected into the respective coils 11–13 at the current input nodes A, B, and C, it being understood that although the nodes A, B, and C are referred to as "current input nodes, the direction of the current may be either into or away from the respective nodes from the center tap connection 15.

Still more particularly, the currents that flow in the respective coils 11–13 to and from the center tap connection 15 are designated by the legends $i_{A-}$ and $i_{A+}$, referring to current flowing respectively from the center tap connection 15 to the terminal A, and from the terminal A to the center tap connection 15 through the coil 11. The legends $i_{B+}$ and $i_{B-}$ designate the current flowing respectively from the center tap connection 15 to the terminal B, and from the terminal B to the center tap connection 15 through the coil 12. Finally, the legends $i_{C+}$ and $i_{C-}$ designate the current flowing respectively from the center tap connection 15 to the terminal C, and from the terminal C to the center tap connection 15 through the coil 13.

Six vectors $B_{A+}$, $B_{A-}$, $B_{C-}$, $B_{C+}$, $B_{B+}$, $B_{B-}$, are developed in the directions shown in response to the respective currents in the coils 11–15. The individual magnetic field vectors are shown individually in FIG. 2 for each of the six phases of current $i_{A+}$, $i_{A-}$, $i_{B+}$, $i_{B-}$, $i_{C+}$, and $i_{C-}$ at three points in the rotational phase of the "Y" rotor assembly 10, with a two pole rotor 17 positioned thereabout.

Thus, beginning at the top of the chart of FIG. 2, in the row marked "Phase A+", with current $i_{A+}$ flowing, during the time that the north pole of the rotor rotates from approximately +150 degrees to −150 degrees, (See FIGS. 10 and 11) the magnetic vector $B_{A+}$ is produced, as shown. At the point at which the north pole of the rotor passes −150 degrees, the current is switched or commutated to flow in the $i_{C-}$ direction, as shown in the second row of the chart of FIG. 2, labeled "Phase C−". The current commutation flowing from the center tap to the terminal C to produce current $i_{C-}$ is continued from the beginning of the phase as the north pole is rotated from −150 degrees to −90 degrees. Such current commutation is continued on the chart shown in FIG. 2 from left to right in each phase, sequentially from top to bottom of the chart, then repeated.

A circuit 20 for accomplishing the uni-coil commutation described above is shown in FIG. 3A. The circuit 20 includes four sets of switch pairs 21, 22, 23, and 24. The switches may be, for example, bipolar power transistors, MOSFETs, or other transistor types known in the art. Each switch pair is connected in series across a supply voltage, shown as a battery 28. Nodes 30–33 are respectively associated with each switch pair 21–24, connected respectively to nodes A, B, C, and Ctap, connected respectively to the terminals A, B, C, and Ctap of the driving coils 10. The switch pairs 21–24 each include an upper, or high side, switch and lower, or low side, switch, and are designated respectively as uA, 1A, uB, 1B, uC, 1C, uCtap, and 1Ctap.

The switches of the switch pairs 21–24 are sequentially turned on and off by a sequencer circuit, described below in detail, in accordance with the table shown in FIG. 3B. In FIG. 3B, the state of the switches of each of the pairs of switches 21–24 is shown for each sequence, beginning at phase A+ through phase B−.

The switching circuit of FIG. 3A, sometimes referred to as a "transconductance circuit" can be fabricated using MOSFET type devices, as shown by the circuit 50 in FIG. 4. As shown, four pair of MOSFET switches 51, 52, 53, and 54 are connected to a "Y" configured coil arrangement 10, similar to that described above with reference to FIG. 1. Each of the MOSFET devices of the pairs 51–54 may be connected to switches 60–67, to be selectively operated to apply a logic state "1" or logic state "0" to the gates of the respective MOSFET devices with which they are associated. The switches 60–67 are operated in accordance with a commutation sequence, in a manner similar to that set forth in the table of 3B described above. If desired, as shown, the logic states of the lower driver transistors can be controlled by a feedback circuit 70, such feedback circuits being known in the art.

The output from the circuit 50 is taken from the interconnections of the respective switches of switch pairs 21–24 at nodes A, B, C, and Ctap. The nodes A, B, C, and Ctap are connected to respective stator terminals A, B, and C of the motor, and the center tap terminal Ctap. Thus, as the commutation controller, or sequencer described below with reference to FIG. 6, sequences the conduction of the various switches of switch pairs 21–24 with a predetermined commutation sequence, current is caused to flow in the various individual stator coils 10 to produce the desired rotation of the rotor of the motor.

It should be noted that the circuit 50 of FIG. 4 can be commutatively sequenced or driven to operate the motor with which it is associated selectively in either a one coil mode or a dual coil mode. or example, the sequencing signals to be applied to the MOSFET devices of the device pairs 51–54 can be selected by the values shown in the table of FIG. 5 for either one coil or dual coil modes of operation. Although the signals that are applied to the various MOSFET devices are shown in FIG. 5 as logic "1" or logic "0" states, such states may be referred to as "on" or "off" states, for example, as shown in the uni-coil mode commutation sequences shown in FIG. 3B.

Figure 6:
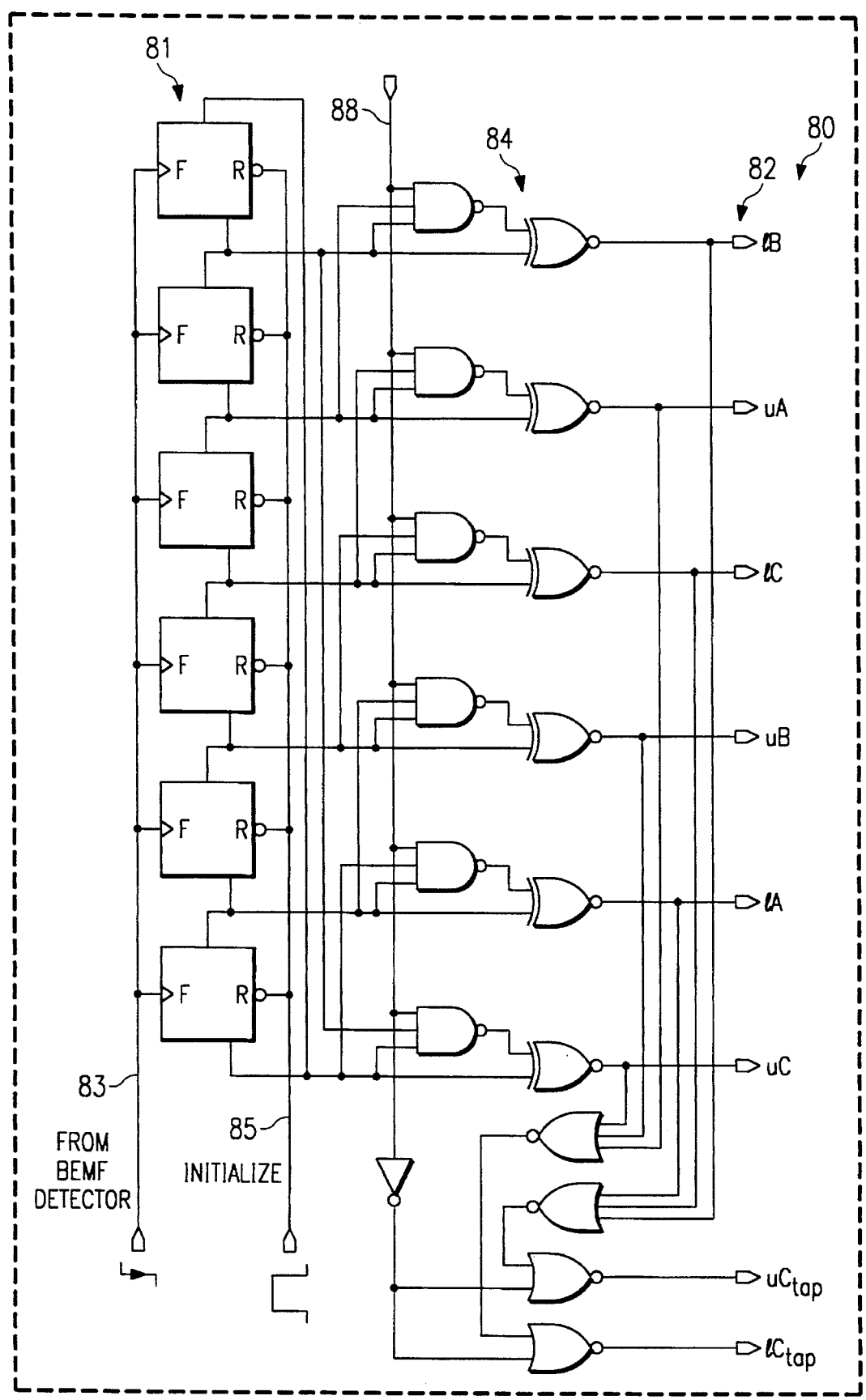
FIG. 6 is an electrical schematic diagram showing a commutation circuit that can be used for uni-coil or dual coil commutation switching in the operation of the driver circuit of FIG. 3A or FIG. 4, in accordance with the invention.

A sequencer circuit 80 that can be used to provide the logic signals to the transconductance circuit 50 of FIG. 4 is shown in FIG. 6. The sequencer 80 includes a shift register 81 through which a series of logic signals is continuously recirculated. The sequencer is initialized by a signal on an initialize line 85 such that the register 81 contains an initial sequence, such as "110000". The outputs from each stage of the shift register 81 are applied to the logic circuitry 84 to present the commutation logic signals on the output terminals 82. The logic sequence is then continuously circulated through the shift register 81 by signals applied to a clock input line 83 representing the back emf signals developed from a floating coil to develop the required continuous commutation output states on the output terminals 82. Consequently, the appropriate logic signals are generated to create the desired commutation switching signals at the output terminals 82 connected to the switching devices of the transconductance circuit with which the sequencer 80 is associated.

In addition to providing commutation signals for the operation of the transconductance circuit in the uni-coil operating mode described above, a signal line 88 is provided in the circuit 80 on which a logic signal can be selectively applied to cause the circuit 80 to produce the required logic sequences on the output terminals 82 to operate the associated transconductance circuit in normal dual coil mode of operation. This can be advantageous, for example, if operation of the motor with which the circuit is associated requires additional torque or in which the supply voltage and drive currents are not of particular concern. For example, it may be desirable to start the motor with which the circuit is associated in dual coil mode to provide for an increased amount of magnetic flux and torque, then, once the rotor has attained a desired rotational velocity, switching to uni-coil operating mode for efficient operation at normal operating speed.

The circuitry of the sequencer 80 and transconductance circuit 50 of FIGS. 6 and 4 can be integrated, if desired, on a semiconductor substrate, denoted by the dotted lines enclosing the respective circuits.

When a three-phase motor is operated with a uni-coil driving sequence, the torque that is created by each of the coils is as shown in the graph of FIG. 7A. The total applied torque of the combined torque from the individual coils is shown in FIG. 7B, and, as shown, has a minimal torque ripple, provided no commutation delay from the zero crossing of the measured back emf produced from one of the floating coils is employed.

Thus, it will be appreciated that in accordance with the method and circuitry of the invention, not only is the series resistance presented by the driving coils reduced, allowing a greater drive current to be accomplished at lower operating voltages, but also the back emf for a given velocity is reduced since the number of flux linkages (i.e. coil turns) are reduced. However, this means that an additional switching stage is needed for the center tap connection to implement a single coil or "uni-coil" mode for sequencing the vectors must be employed. In addition, in order to minimize torque ripple, the commutation delay must be eliminated or minimized, allowing commutation to occur immediately after the detection of a zero crossing of the back emf.

Figure 8A:
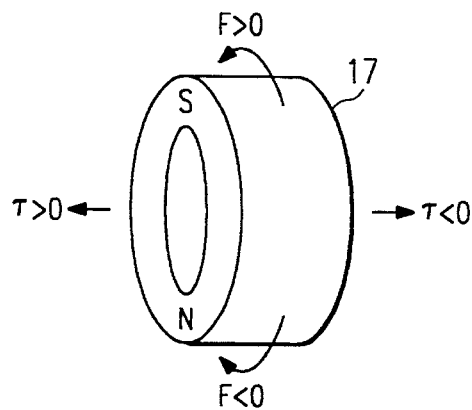
FIGS. 8A and 8B are respectively perspective and side elevation views of a motor rotor, showing the conventions for torque and forces as used herein.
Figure 8B:
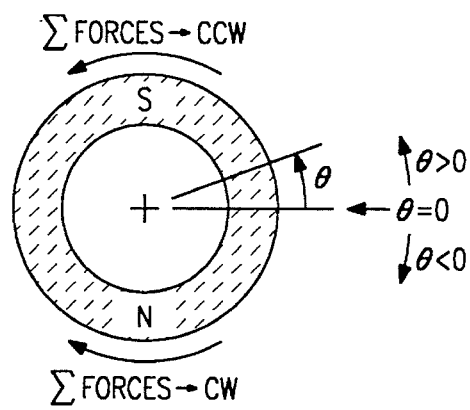

A perspective view and side elevation view of a rotor 17 are respectively shown in FIGS. 8A and 8B to illustrate the torque, force, and angular conventions used in the various graphs herein. The rotor 17, as shown, is a two pole rotor, having a single "South" (or "S") pole and a single "North" (or "N") pole, as shown. It will be appreciated that the principles of the invention are equally applicable to motors having differently numbered and spaced poles.

Figure 9:
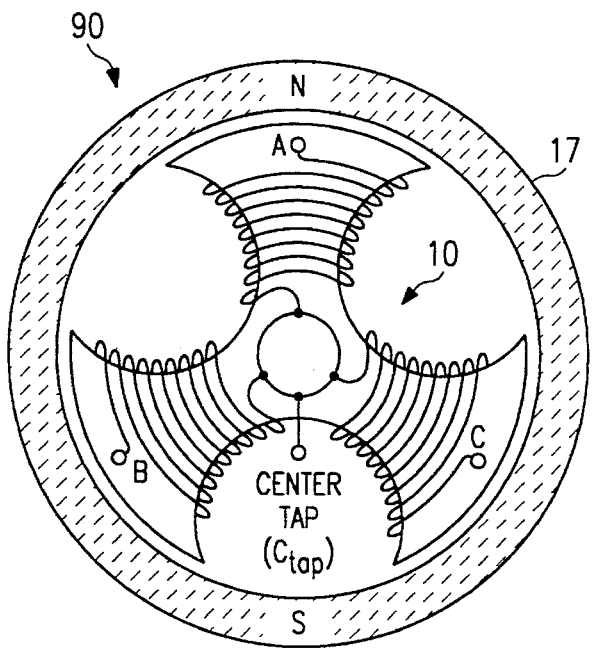
FIG. 9 shows a side elevation of a three-phase motor typical "Y" configured coils in relationship to an outside two pole rotor structure.
Figure 10:
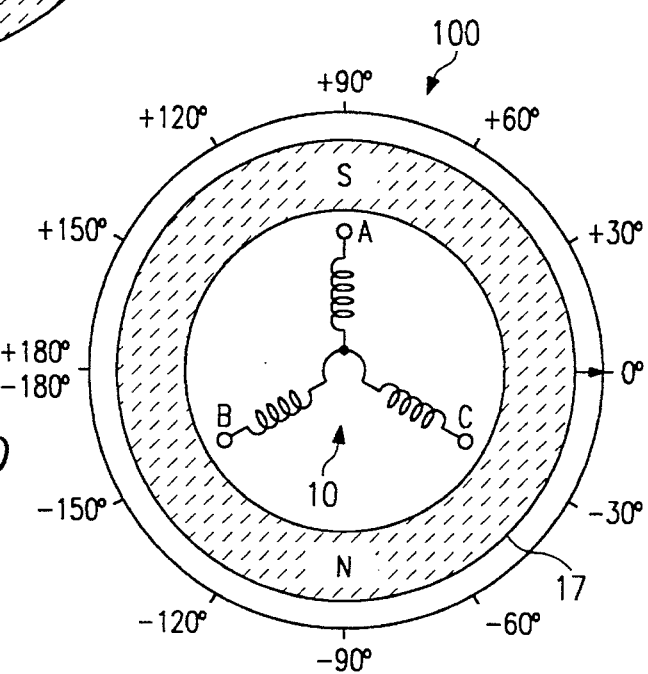
FIG. 10 is a diagrammatic illustration of an equivalent structure of the motor of FIG. 9, showing an external rotational scale for reference.

The relationship of the rotor 17 to the coil assembly 10 in a typical motor 90 is shown in FIG. 9. The motor 90 shown in FIG. 9 is of typical construction to the motor that might be found in an actual application, but is stylized for illustration herein typically in the manner shown in FIG. 10. The motor embodiment 100 of FIG. 10 additionally shows an external angular scale for reference. The angular scale of the drawing in FIG. 10 is the same angular scale on the various representations of the motor in the different phases shown in FIG. 2 above. The convention used in the various graphs herein from the representation shown in FIG. 10 is positioned as shown to represent a zero degree rotational position.

Figure 11:
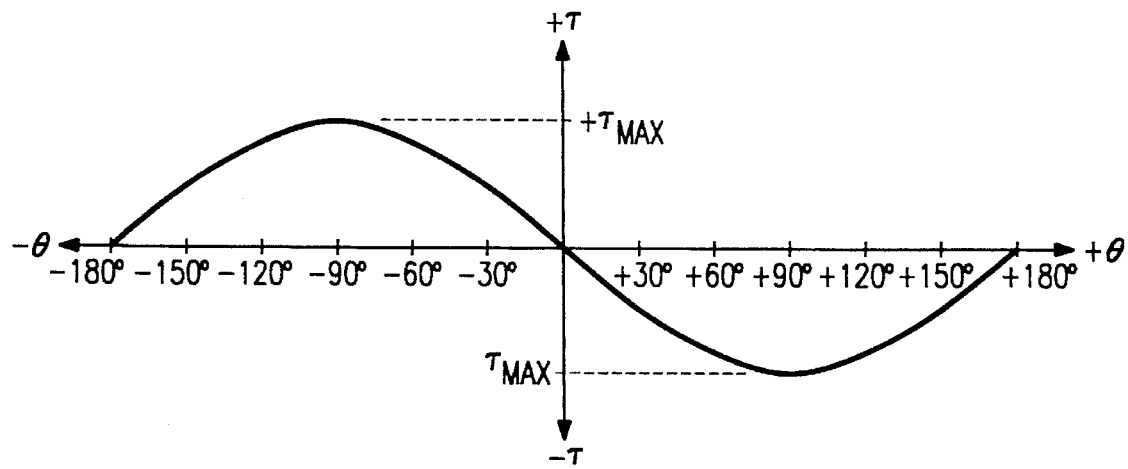
FIG. 11 is a graph of torque characteristic created by one of the motor coils (coil "A"), illustrating torque vs. position angle of the rotor.
Figure 12:
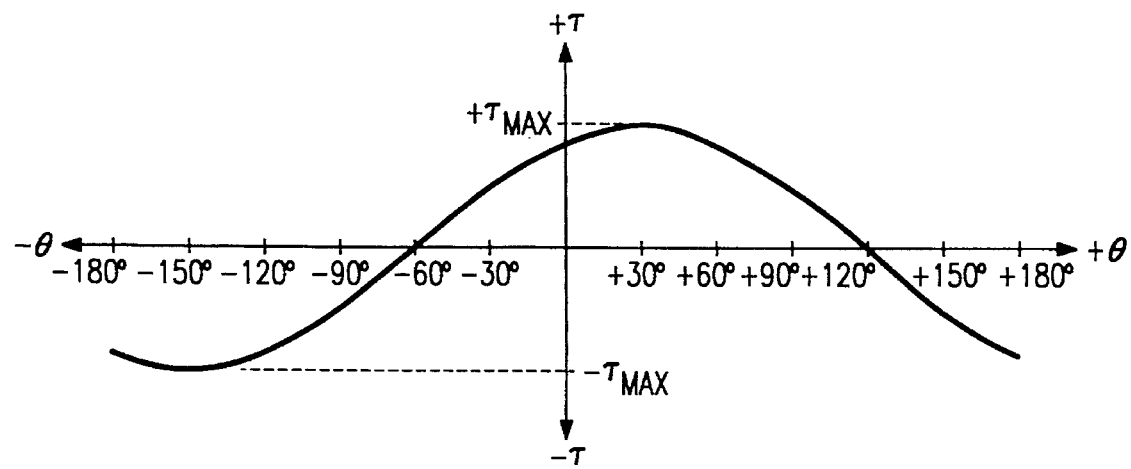
FIG. 12 is a graph of torque characteristic created by one of the motor coils (coil "B"), illustrating torque vs. position angle of the rotor.
Figure 13:
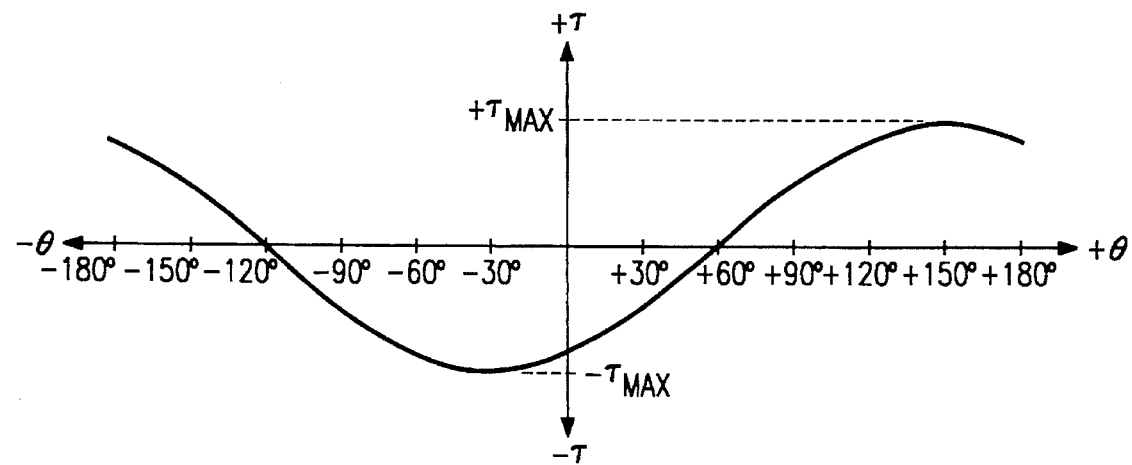
FIG. 13 is a graph of torque characteristic created by one of the motor coils (coil "C"), illustrating torque vs. position angle of the rotor.

Thus, from the position shown of the rotor with respect to the coil assembly in the motor 100 of FIG. 10 as a reference, the torque produced by the coils of the coil assembly 10 on the rotor 17 are respectively shown in FIGS. 11, 12, and 13.

Although the invention has been described and illustrated with a certain degree of particularity, it is understood that the present disclosure has been made only by way of example, and that numerous changes in the combination and arrangement of parts may be resorted to by those skilled in the art without departing from the spirit and scope of the invention as hereinafter claimed.

I claim:

1. A circuit for connection across a voltage source for operating a three-phase dc motor of the type having a plurality of wye connected driving coils, comprising:

a center tap connection at which said driving coils are connected, each said driving coil having a current input node at an end opposite said center tap;

four pairs of switches, each pair being arranged for connection in series across said voltage source, each pair of switches having a connection node between each switch of each pair, the connection nodes of three of said pairs being connected to a respective one of said current input nodes of said coils and the connection node of a fourth one of said pairs being connected to said center tap;

and a sequencer for selectively operating said switches to drive current between single sequentially selected said driving coils and said center tap wherein said sequencer operates to close said switches in accordance with the following table:

| | Current flows from-to | Floating Coils | uA | lA | uB | lB | uC | lC | uC$_{tap}$ | lC$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |

-continued

| | Current flows from–to | Floating Coils | uA | 1A | uB | 1B | uC | 1C | uC$_{tap}$ | 1C$_{tap}$ |
|---|---|---|---|---|---|---|---|---|---|---|
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF | in which:

the center tap is denoted Ctap;

each coil is denoted respectively A, B, and C;

a plurality of high side switches denoted respectively uA, uB, uC, uCtap;

a plurality of low side Switches are denoted respectively 1A, 1B, 1C, 1Ctap;

a phase is denoted (+) if current flows into the designated coil to the center tap and (–) if current flows out of the designated coil from the center tap;

an open switch is denoted OFF, and a closed switch is denoted "ON".

2. The circuit of claim 1 wherein each of said switches is a MOSFET.

3. The circuit of claim 1 wherein said polyphase dc motor is a three-phase dc motor.

4. The circuit of claim 3 wherein said motor has a two pole rotor.

5. The circuit of claim 1 wherein said motor is a sensorless motor in which a position of a rotor of the motor is determined by observation of a bemf signal of a floating driving coil.

6. A circuit for connection across a voltage source for operating a three-phase dc motor of the type having a plurality of wye connected driving coils, comprising:

a center tap connection at which said driving coils are connected, each said driving coil having a current input node at an end opposite said center tap;

four pairs of switches, each pair being arranged for connection in series across said voltage source, each pair of switches having a connection node between each switch of each pair, the connection nodes of three of said pairs being connected to a respective one of said current input nodes of said coils and the connection node of a fourth one of said pairs being connected to said center tap; and a sequencer for selectively operating said switches to drive current between single sequentially selected said driving coils and said center tap wherein said sequencer comprises means to selectively operate in one coil and two coil modes to close said switches in accordance with the following table:

| | Current flows from–to | Floating Coils | uA | 1A | uB | 1B | uC | 1C | uC$_{tap}$ | 1C$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF |
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF | in which:

the center tap is denoted Ctap;

each coil is denoted respectively A, B, and C;

a plurality of high side switches denoted respectively uA, uB, uC, uCtap;

a plurality of low side switches are denoted respectively 1A, 1B, 1C, 1Ctap;

a phase is denoted (+) if current flows into the designated coil to the center tap and (–) if current flows out of the designated coil from the center tap;

an open switch is denoted OFF, and a closed switch is denoted "ON".

7. A method for operating a polyphase dc motor of the type having a plurality of driving coils connected together at a center tap current input node, each driving coil having a coil current input node at an end opposite said center tap connection, and a plurality of pairs of switches, each pair being arranged for connection in series across a power supply voltage, each pair having a connection node between each switch of each pair, connected to a respective one of said coil current input nodes comprising:

providing an additional pair of switches arranged for connection in series across the power supply voltage and having a connection node between each switch connected to the center tap; and individually operating said switches to cause a driving current to be passed between single sequentially selected said driving coils and said center tap current input node;

further comprising providing a sequencing circuit for individual operating said switches to cause a driving current to be passed between sequentially selected only single ones of said driving coils and said center tap current input node in accordance with the following table:

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF | in which:

the center tap is denoted Ctap;

each coil is denoted respectively A, B, and C;

a plurality of high side switches denoted respectively uA, uB, uC, uCtap;

a plurality of low side switches are denoted respectively 1A, 1B, 1C, 1Ctap;.

a phase is denoted (+) if current flows into the designated coil to the center tap and (–) if current flows out of the designated coil from the center tap;

an open switch is denoted OFF, and a closed switch is denoted "ON".

8. The method of claim 7 wherein each of said switches is a MOSFET.

9. The method of claim 7 wherein said polyphase dc motor is a three-phase dc motor.

10. The method of claim 9 wherein said plurality of driving coils comprise a "Y" connected set of driving coils.

11. The method of claim 10 wherein said motor has a two pole rotor.

12. The method of claim 7 further comprising sensing a bemf of a floating coil to initiate a commutation.

13. A method for operating a polyphase dc motor of the type having a plurality of driving coils connected together at a center tap current input node, each driving coil having a coil current input node at an end opposite said center tap connection, and a plurality of pairs of switches, each pair being arranged for connection in series across a power supply voltage, each pair having a connection node between each switch of each pair, connected to a respective one of said coil current input nodes comprising:

providing an additional pair of switches arranged for connection in series across the power supply voltage and having a connection node between each switch connected to the center tap; and individually operating said switches to cause a driving current to be passed between single sequentially selected said driving coils and said center tap current input node;

whereby the step of individually operating said switches further comprises providing a sequencing circuit for individually operating said switches in single coil mode or dual mode, to cause a driving current to be passed between selected coils in accordance with the following table:

|  | Current flows from–to | Floating Coils | uA | 1A | uB | 1B | uC | 1C | uC$_{tap}$ | 1C$_{tap}$ |
|---|---|---|---|---|---|---|---|---|---|---|
| Phase A+ | A–C$_{tap}$ | B&C | ON | OFF | OFF | OFF | OFF | OFF | OFF | ON |
| Phase C– | C$_{tap}$–C | A&B | OFF | OFF | OFF | OFF | OFF | ON | ON | OFF |
| Phase B+ | B–C$_{tap}$ | A&C | OFF | OFF | ON | OFF | OFF | OFF | OFF | ON |
| Phase A– | C$_{tap}$–A | B&C | OFF | ON | OFF | OFF | OFF | OFF | ON | OFF |
| Phase C+ | C–C$_{tap}$ | A&B | OFF | OFF | OFF | OFF | ON | OFF | OFF | ON |
| Phase B– | C$_{tap}$–B | A&C | OFF | OFF | OFF | ON | OFF | OFF | ON | OFF |
| Phase 1 | A–B | C | ON | OFF | OFF | ON | OFF | OFF | OFF | OFF |
| Phase 2 | A–C | B | ON | OFF | OFF | OFF | OFF | ON | OFF | OFF |
| Phase 3 | B–C | A | OFF | OFF | ON | OFF | OFF | ON | OFF | OFF |
| Phase 4 | B–A | C | OFF | ON | ON | OFF | OFF | OFF | OFF | OFF |
| Phase 5 | C–A | B | OFF | ON | OFF | OFF | ON | OFF | OFF | OFF |
| Phase 6 | C–B | A | OFF | OFF | OFF | ON | ON | OFF | OFF | OFF | in which:

the center tap is denoted Ctap;

each coil is denoted respectively A, B, and C;

a plurality of high side switches are denoted respectively uA, uB, uC, uCtap;

a plurality of low side switches are denoted respectively 1A, 1B, 1C, 1Ctap;

a phase is denoted (+) if current flows into the designated coil to the center tap and (–) if current flows out of the designated coil from the center tap;

an open switch is denoted OFF, and a closed switch is denoted "ON".

* * * * *